US007125051B2

(12) United States Patent
Usui et al.

(10) Patent No.: US 7,125,051 B2
(45) Date of Patent: Oct. 24, 2006

(54) COMMON-RAIL INJECTION SYSTEM FOR DIESEL ENGINE

(75) Inventors: Masayoshi Usui, Numazu (JP); Kikuo Asada, Mishima (JP); Teruhisa Takahashi, Mishima (JP)

(73) Assignee: Usui Kokusai Sangyo Kaisha Limited(JP)

( * ) Notice: Subject to any disclaimer, the term of this patent is extended or adjusted under 35 U.S.C. 154(b) by 112 days.

(21) Appl. No.: 10/616,571

(22) Filed: Jul. 10, 2003

(65) Prior Publication Data

US 2005/0005910 A1 Jan. 13, 2005

(51) Int. Cl.
*F16L 5/00* (2006.01)

(52) U.S. Cl. ................................. 285/197; 285/133.11

(58) Field of Classification Search ................ 285/197, 285/133.11

See application file for complete search history.

(56) References Cited

U.S. PATENT DOCUMENTS 4,832,376 A 5/1989 Sugao
4,893,601 A 1/1990 Sugao
4,900,180 A 2/1990 Takikawa
4,953,896 A * 9/1990 Usui .......................... 285/197
5,120,084 A 6/1992 Hashimoto
5,143,410 A 9/1992 Takikawa
5,169,182 A 12/1992 Hashimoto
5,172,939 A 12/1992 Hashimoto
5,177,990 A * 1/1993 Isgen ............................ 72/54
5,261,705 A * 11/1993 Takahashi et al. .......... 285/197
5,667,255 A 9/1997 Kato
5,887,910 A 3/1999 Usui
5,903,964 A 5/1999 Uematsu et al.
5,957,507 A 9/1999 Asada
5,979,945 A 11/1999 Hitachi et al.
5,992,904 A 11/1999 Hitachi et al.
6,045,162 A * 4/2000 Haibara ....................... 285/55
6,050,611 A 4/2000 Asada
6,070,618 A 6/2000 Iwabuchi
6,126,208 A 10/2000 Asada et al.
6,276,336 B1 * 8/2001 Kruger et al. .............. 123/456
6,397,881 B1 6/2002 Asada et al.
6,408,826 B1 6/2002 Asada et al.
6,415,768 B1 7/2002 Usui
6,463,909 B1 10/2002 Asada et al.
6,494,183 B1 12/2002 Usui et al.
6,736,431 B1 * 5/2004 Jung et al. ............... 285/288.1
2004/0080156 A1 * 4/2004 Usui ..................... 285/133.11

FOREIGN PATENT DOCUMENTS

JP 2-80289 6/1990
JP 3-177693 8/1991
JP 4-175462 6/1992
JP 2002310034 A * 10/2002 ................. 285/197
JP 2004092551 A * 3/2004 ................. 285/197

* cited by examiner

*Primary Examiner*—Aaron Dunwoody
(74) *Attorney, Agent, or Firm*—Gerald E. Hespos; Anthony J. Casella

(57) ABSTRACT

A common-rail injection system is provided for a diesel engine and has excellent internal pressure fatigue resisting characteristics, vibrational fatigue resisting characteristics and cavitation resisting property and sheet face flawing resisting property, and can be made thin and light in weight. A main pipe rail is manufactured by transformation induced plastic type strength steel. After the main pipe rail is processed, residual austenite is generated by heat treatment, and the reduction processing of stress concentration of a branch hole and a main pipe rail side flow passage crossing portion is performed. Further, it is preferable that an induced plastic transformation is generated on the inner surface of the main pipe rail by autofrettage processing, and compression residual stress is left.

4 Claims, 3 Drawing Sheets

COMMON-RAIL INJECTION SYSTEM FOR DIESEL ENGINE

BACKGROUND OF THE INVENTION

1. Field of the Invention

The present invention generally relates to a common-rail injection system such as a high pressure fuel manifold or a block rail, etc. in an accumulating pressure fuel ejecting system of a diesel internal combustion engine, and particularly relates to a common-rail injection system for a diesel engine raised in internal pressure fatigue strength.

2. Description of the Prior Arts

As the common-rail injection system of this kind, for example, a common-rail injection system shown in FIG. 1, a common-rail injection system shown in FIG. 2, common-rail injection systems shown in FIGS. 3 and 4, an unillustrated block rail type common-rail injection system, etc. are conventionally known. In the common-rail injection system shown in FIG. 1, a boss 3*c* integrated with a main pipe rail 1 of the common-rail injection system is formed in this main pipe rail 1. A pressing seating face 2-3 formed in a connecting head portion 2-2 of a branch pipe 2 is abutted on a pressure receiving seating face 1-3 on the main pipe rail 1 side and is engaged with this pressure receiving seating face 1-3, and is connected by fastening a box nut 6 screwed onto a screw portion 3-2 arranged on the outer circumferential face of the above boss 3*c*. In the common-rail injection system shown in FIG. 2, a portion of a branch hole 1-2 communicated with an internal flow passage 1-1 of a circular section arranged in a circumferential wall portion on the side of a main pipe rail 1 is formed as a pressure receiving seating face 1-3 opened outward. A pressing seating face 2-3 formed in a connecting head portion 2-2 on the side of a branch pipe 2 as a branch connecting body formed in e.g., a tapering-off conical shape and enlarged in diameter by buckling molding in an end portion is abutted on the pressure receiving seating face 1-3 and is engaged with this pressure receiving seating face 1-3 by using a joint fitting 3 of a ring shape surrounding the outer circumferential portion of the main pipe rail 1 near the pressure receiving seating face. A portion of a screw wall 3-1 is projected outward from the main pipe rail 1, and is arranged in the joint fitting so as to be projected in the diametrical direction of the above main pipe rail 1. A nut 4 is assembled into the side of the branch pipe 2 in advance through a sleeve washer 5. The pressing seating face 2-3 is fastened and connected to the pressure receiving seating face 1-3 by pressing below a neck portion of the above connecting head portion 2-2 by screwing the nut 4 into the screw wall 3-1 portion. In the common-rail injection systems shown in FIGS. 3 and 4, sleeve nipples 3*a*, 3*b* of a sleeve shape instead of the joint fitting 3 of a ring shape are directly attached to the outer circumferential wall of the main pipe rail 1 by an irregular fitting screwing system, welding, etc. so as to be projected outward in the diametrical direction of the main pipe rail 1. A pressing seating face 2-3 formed in a connecting head portion 2-2 on the side of a branch pipe 2 is abutted on a pressure receiving seating face 1-3 on the side of the main pipe rail 1, and is engaged with this pressure receiving seating face 1-3, and is connected by fastening a nut 4 screwed into each of the above sleeve nipples 3*a*, 3*b*.

However, in each of the above conventional common-rail injection systems, large stress is generated in a lower end inner peripheral portion P of the branch hole 1-2 by axial force applied to the pressure receiving seating face 1-3 by the internal pressure of the main pipe rail 1 and the pressing of the connecting head portion 2-2 of the branch connecting body such as the branch pipe 2. Therefore, a crack is easily caused with the lower end inner peripheral portion P as a starting point, and there is a possibility of generation of leakage of a fuel. The crack is next easily caused on the inner surface of the main pipe rail. This is because the main pipe rail is constructed by a thick cylinder, but a large tensile stress in the circumferential direction is caused on the inner surface since the main pipe rail has a large inside diameter.

The present invention is made in consideration of the above problems caused in the prior art, and an object of the present invention is to provide a common-rail injection system for a diesel engine in which the internal pressure fatigue strengths of the main pipe rail and the branch hole are raised by using transformation induced plastic type strength steel, and can be further improved by reducing the concentrating degree of stress generated in a crossing portion of the branch hole including the lower end inner peripheral portion with respect to the main pipe rail and a main pipe rail side flow passage.

SUMMARY OF THE INVENTION

The present invention resides in a common-rail injection system for a diesel engine constructed such that a branch hole communicated with a flow passage is formed in an axial circumferential wall portion of a main pipe rail having the flow passage within its axial core direction, and a branch connecting body is connected to the branch hole integrally with the main pipe rail or through a separate joint member, and characterized in that the main pipe rail is manufactured by transformation induced plastic type strength steel, and the main pipe rail is processed and residual austenite is then generated by heat treatment, and the processing hardening of an inner surface and compression residual stress are left by performing the reduction processing of stress concentration of the branch hole and a main pipe rail side flow passage crossing portion. The present invention is also characterized in that residual austenite is generated by heat treatment in the main pipe rail manufactured by transformation induced plastic type strength steel, and the main pipe rail is then processed and the processing hardening of an inner surface and compression residual stress are left by performing the reduction processing of stress concentration of the branch hole and a main pipe rail side flow passage crossing portion. Further, the present invention is characterized in that an induced plastic transformation is generated on the inner surface by autofrettage processing, and the compression residual stress is left after the reduction processing of the stress concentration of the branch hole and the main pipe rail side flow passage crossing portion is performed.

DETAILED DESCRIPTION OF PREFERRED EMBODIMENTS

Figure 1:
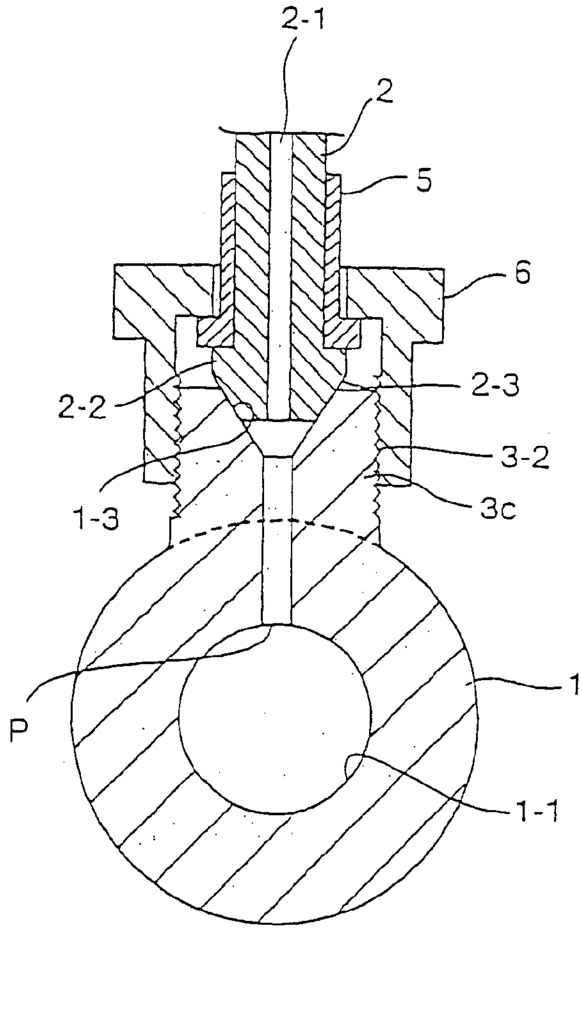
FIG. 1 is a longitudinal sectional front view showing one example of a common-rail injection system of a boss integral type as an object of the present invention.
Figure 2:
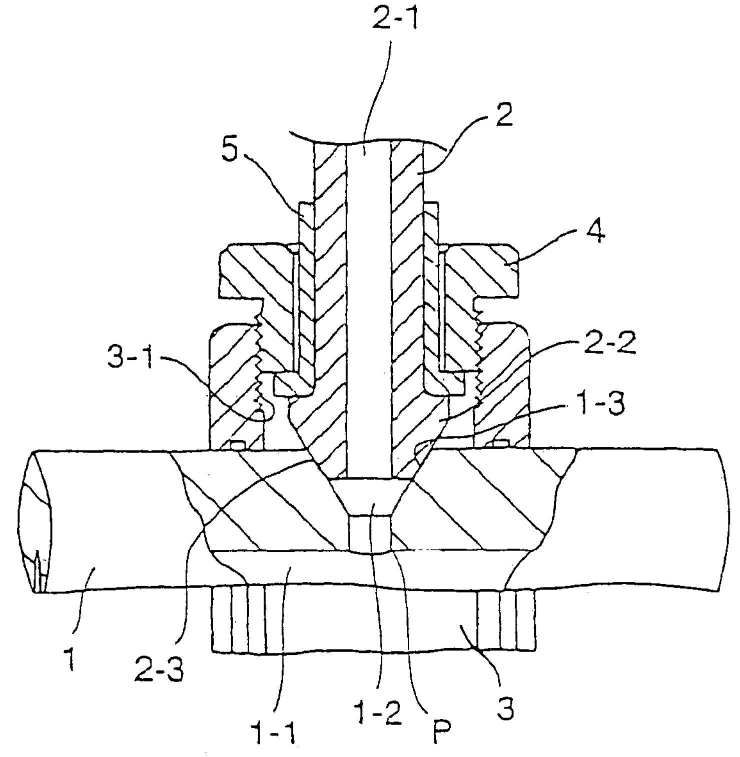
FIG. 2 is a longitudinal sectional side view of a main portion showing one example of the common-rail injection system using a joint fitting of a ring shape.
Figure 3:
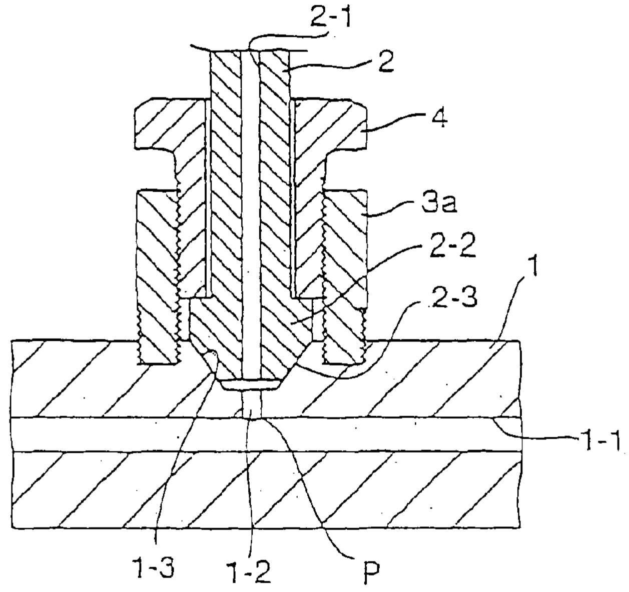
FIG. 3 is a longitudinal sectional side view showing one example of the common-rail injection system constructed by attaching a sleeve nipple of a sleeve shape to a main pipe rail by an irregular fitting screwing system.
Figure 4:
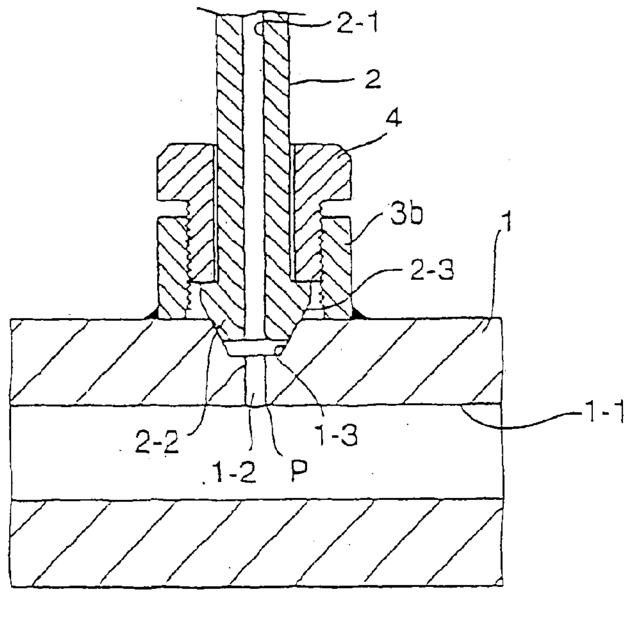
FIG. 4 is a longitudinal sectional side view showing one example of the common-rail injection system constructed by attaching the sleeve nipple of the sleeve shape to the main pipe rail by welding.

Transformation induced plastic type strength steel in the present invention is developed for the purpose of making a press molding part around a foot in a passenger car light in weight in recent years. This transformation induced plastic type strength steel is ferrite ($\alpha_f$)+bainite ($\alpha_b$)+$\gamma_R$ composite texture steel [TRIP type Dual-Phase steel, TDP steel], and bainitic ferrite ($\alpha_{bf}$)+$\gamma_R$ steel [TRIP type bainite steel, TB steel] in which press molding property is greatly improved by utilizing the strain induced transformation (TRIP) of residual austenite ($\gamma_R$)

Here, the transformation induced plasticity is the large extension of an austenite ($\gamma$) layer existing in a scientifically unstable state caused in transformation to martensite by adding mechanical energy.

Namely, the TRIP steel is steel in which the metallic texture of a mixture of the residual austenite and the bainite texture with the grain boundary of an $\alpha$-layer as a center is obtained by taking a specific heat treatment in the steel of a certain limited composition. As features of the TRIP steel having such a metallic texture, plastic deformation ability is high and the TRIP steel is high in strength and becomes hard since the TRIP steel becomes a martensite texture by plastic processing.

Since the common-rail injection system for a diesel engine in the present invention is manufactured by the transformation induced plastic type strength steel having such characteristics, the common-rail injection system has good processability at a forging time, and is easily formed in a desirable shape. In contrast to this, when no specific heat treatment is taken (when the residual austenite and bainite are small), both extension and tensile strength are low and cutting processing can be easily performed. In the case of the common-rail injection system using a pipe, a reduction at a pipe extending time is set to be large so that the number of pipe extending times can be reduced. Further, if the reduction is the same, processing can be performed by a small pipe extending machine and a small die.

Further, the transformation induced plastic type strength steel has characteristics (TRIP phenomenon) in which the austenite of a locally deformed portion is transformed to hard martensite, and its portion is strengthened. Accordingly, in the case of the common-rail injection system manufactured by this transformation induced plastic type strength steel, even when internal pressure fatigue is advanced, its fatigue portion is strengthened by the above characteristics and resistance force for preventing breakdown of the common-rail injection system is generated so that life is extended.

Further, since a branch hole and a main pipe rail side flow passage crossing portion are pressed in stress concentration reducing processing, compression residual stress is left around the branch hole. Further, since both hardness and tensile strength are improved by the deposition of processing induced martensite in the deforming portion, fatigue resisting characteristics are excellent.

In the heat treatment in the present invention, the main pipe rail is heated to 950° C., and is held for a predetermined time so that the main pipe rail is changed to austenite. Thereafter, the main pipe rail is held for a predetermined time at 350° C. to 500° C., and austemper processing is performed. A metallic texture having a residual austenite ($\gamma$) layer and a bainite texture mixed with each other is formed with the grain boundary of an $\alpha$ layer as a center by performing this austemper processing.

A method for leaving the compression residual stress by a pressing system is known as the reduction processing method of stress concentration of the branch hole and the main pipe rail side flow passage crossing portion in the present invention. As this method, for example, there are four methods described in JP-A-10-318081, etc. proposed by the present applicant. (1) In a first method, the compression residual stress is generated around a main pipe rail flow passage opening end portion of the branch hole by applying pressing force by an external pressure system. (2) In a second method, the compression residual stress is generated around the main pipe rail flow passage opening end portion of the branch hole by applying pressing force to the inner circumferential face of the main pipe rail near the branch hole by an internal pressure system. (3) In a third method, the compression residual stress is generated around the main pipe rail flow passage opening end portion of the branch hole by applying the pressing force by a pipe enlarging system for applying the pressing force to the inner circumferential face of the main pipe rail near the branch hole in the diametrical direction of the pipe from the interior of the main pipe rail. (4) In a fourth method, the compression residual stress is generated around the main pipe rail flow passage opening end portion of the branch hole by applying the pressing force by a diameter enlarging system for applying the pressing force to the inner circumferential face of the branch hole in the diametrical direction from the interior of the branch hole.

When the main pipe rail is excessively hardened by the heat treatment to raise the fatigue strength as steel (large in strength and small in extension), there is a case in which a crack is caused when pressing processing using the above pressing system is too strong. Further, a problem exists in that a tool (press pin) for pressing pressure is easily damaged, etc. However, in the case of the transformation induced plastic type strength steel (TRIP steel), there is no such a problem since strength is high and extension is large.

Autofrettage processing in the present invention is a method for plastically deforming only the inner circumferential surface by applying internal pressure. The main pipe rail is processed and hardened (both hardness and tensile strength are improved by the deposition of processed induced martensite) by the plastic deformation in the entire inner surface portion by this autofrettage processing. Further, the compression stress is left in the entire inner surface portion, and durability of the main pipe flow passage as the next weak point is also improved.

In the present invention, as mentioned above, both hardness and tensile strength are improved by the deposition of the processed induced martensite by taking the heat treatment and the pressing processing, and preferably further performing the autofrettage processing after mechanical processing of the TRIP steel although it was the austenite ($\gamma$) texture. Further, internal pressure fatigue resisting characteristics are also improved in the entire inner surface portion in addition to the branch hole and the main pipe rail side flow passage crossing portion by leaving the compression stress so that the durability of the main pipe flow path becomes excellent.

A round bar for forging manufactured by TRIP type bainite steel (TB steel) having components shown in Table 1 is cut to a predetermined size, and is heated until a hot forging temperature, and the raw material of a common-rail injection system (34 mmϕ in the outside diameter of a tubular portion) of a boss integral type is forged by die forging. Next, the processings of an inside diameter 10 mmϕ, a boss portion branch hole diameter 3 mmϕ, a sheet face, a screw portion, etc. in predetermined desirable portions are performed by cutting, etc. These processed portions are changed to austenite for 20 minutes at 950° C., and austemper processing is then performed by holding these portions for three minutes at 400° C. Thus, the common-rail injection system of the boss integral type having a texture having a residual austenite (γ) layer and a bainite texture mixed with each other with the grain boundary of an α layer as a center is formed. Thereafter, pressing force is applied to a branch hole portion of each boss of this common-rail injection system by an external pressure system described in JP-A-10-318081, and compression residual stress is generated around a main pipe rail flow passage opening end portion of the branch hole. Since the residual austenite layer and the bainite texture are small at a cutting processing time, tensile strength is low and extension is small so that processing is easily performed.

This common-rail injection system is repeatedly tested by a pressure tester, and its fatigue limit is examined. As a result, in the case of the common-rail injection system of the same size manufactured by normal high strength steel (SCM435) (C 0.33 to 0.38 mass %, Si 0.15 to 0.35 mass %, Mn 0.60 to 0.85 mass %, P 0.030 mass % or less, S 0.030 mass % or less, Cr 0.90 to 1.20 mass %, and Mo 0.15 to 0.30 mass %) used as a comparison material, the common-rail injection system is damaged by 800 thousand repeating tests using an oil pressure of 180 to 1500 Bar. In contrast to this, the common-rail injection system in the present invention is not damaged even by 10 million repeating tests at 2200 Bar and shows excellent internal pressure fatigue resisting characteristics.

In another example, a round bar for forging manufactured by TRIP type bainite steel (TB steel) having components shown in Table 1 is cut to a predetermined size, and is changed to austenite for 20 minutes at 950° C. Thereafter, austemper processing is performed by holding the round bar for three minutes in a range of 350 to 475° C. so that a texture having the residual austenite (γ) layer and the bainite texture mixed with each other with the grain boundary of an α-layer as a center is formed. This round bar is then forged by die forging so that the common-rail injection system (34 mmϕ in the outside diameter of a tubular portion) of the boss integral type is forged. Next, the processings of an inside diameter 10.6 mmϕ, a boss portion branch hole diameter 3 mmϕ, a sheet face, a screw portion, etc. in desirable portions are performed by cutting, etc. so that the common-rail injection system of the boss integral type is formed. Thereafter, pressing force is applied to a branch hole portion of each boss of this common-rail injection system by the external pressure system described in JP-A-10-318081, and compression residual stress is generated around a main pipe rail flow passage opening end portion of the branch hole. The residual austenite layer and the bainite texture exist at a forging time, and tensile strength is high but extension is large so that forging processing can be performed. Further, autofrettage processing is performed by applying internal pressure able to yield about 50% of the thickness of the tubular portion.

This common-rail injection system is repeatedly tested by a pressure tester, and its fatigue limit is examined. As a result, the common-rail injection system is not damaged even by 10 million repeating tests at 2400 Bar, and shows more excellent internal pressure fatigue resisting characteristic durability.

In another example, desirable processing of a branch hole diameter 3 mmϕ, a sheet face, a screw portion, etc. is performed by cutting, etc. in a common-rail injection system raw material (outside diameter 36 mmϕ and inside diameter 10 mmϕ of the pipe) obtained by cutting a seamless steel pipe manufactured by TRIP type bainite steel (TB steel) having components shown in Table 1 to a predetermined size. This common-rail injection system raw material is changed to austenite for 20 minutes at 950° C. Thereafter, austemper processing is performed by holding the common-rail injection system raw material for three minutes in a range of 350° C. to 475° C. so that the common-rail injection system having a texture having the residual austenite (γ) layer and the bainite texture mixed with each other with the grain boundary of an α-layer as a center is formed. Thereafter, pressing force is applied to a branch hole portion of this common-rail injection system by the external pressure system described in JP-A-10-318081, and compression residual stress is generated around a main pipe rail flow passage opening end portion of the branch hole. Since the residual austenite layer and the bainite texture are small at the cutting processing time, tensile strength is low and extension is small so that processing is very easily performed.

This common-rail injection system is repeatedly tested by a pressure tester, and its fatigue limit is examined. As a result, in this embodiment, the common-rail injection system is also not damaged even by 10 million repeating tests at 2200 Bar, and shows excellent internal pressure fatigue resisting characteristic durability.

Similar effects are also naturally obtained in the case of a block rail manufactured by the TRIP type bainite steel (TB steel).

TABLE 1

| C | Si | Mn | Al |
|---|---|---|---|
| 0.17 | 1.41 | 2.02 | 0.032 |

(mass %)

As explained above, the common-rail injection system for the diesel engine in the present invention has excellent internal pressure fatigue resisting characteristics by processed induced martensite deposited in a crossing portion of the branch hole and the main pipe rail side flow passage and an inner peripheral portion of the branch hole and improved in both hardness and tensile strength, and compression residual stress. Further, this common-rail injection system has excellent internal pressure fatigue resisting characteristics over the entire inner surface of the common-rail injection system as well as the crossing portion of the branch hole and the main pipe rail side flow passage and the inner peripheral portion of the branch hole by performing the autofrettage processing. Accordingly, durability at very high pressure can be secured. Further, there are also effects in that the common-rail injection system is excellent in vibrational fatigue resisting characteristics and cavitation resisting property and the flawing resisting property of a sheet face in addition to the excellent internal pressure fatigue resisting characteristics, and can be made thin and light in weight, etc.

The invention claimed is:

1. A common-rail injection system for a diesel engine, the common-rail injection system comprising: a main pipe rail with an axially-extending circumferential wall having an inner circumferential surface defining an axial flow passage through said main pipe rail, at least one branch hole extending through the axially-extending circumferential wall of the main pipe rail and communicating with the axial flow passage of the main pipe rail, said main pipe rail being formed from a transformation induced plastic type strength steel with substantially no stainless steel, a residual austenite being defined at least in a layer of the main pipe rail, a compression residual stress being defined in the axially-extending circumferential wall of the main pipe rail at locations surrounding the branch hole for defining a process-induced martensite at said locations surrounding the branch hole.

2. The common-rail injection system of claim 1, wherein the system further includes a branch connection body extending transversely from the main pipe rail at locations aligned with the branch hole.

3. The common-rail injection system of claim 1, wherein the branch connecting body is formed integrally with the main pipe rail.

4. The common-rail injection system of claim 1, wherein the compression residual stress is defined around a crossing portion of the main pipe rail flow passage and the branch hole.

* * * * *